No. 746,505. PATENTED DEC. 8, 1903.
G. J. HASLAM.
GUIDE AND REGULATING DEVICE FOR EGG CUTTERS.
APPLICATION FILED AUG. 19, 1903.
NO MODEL.
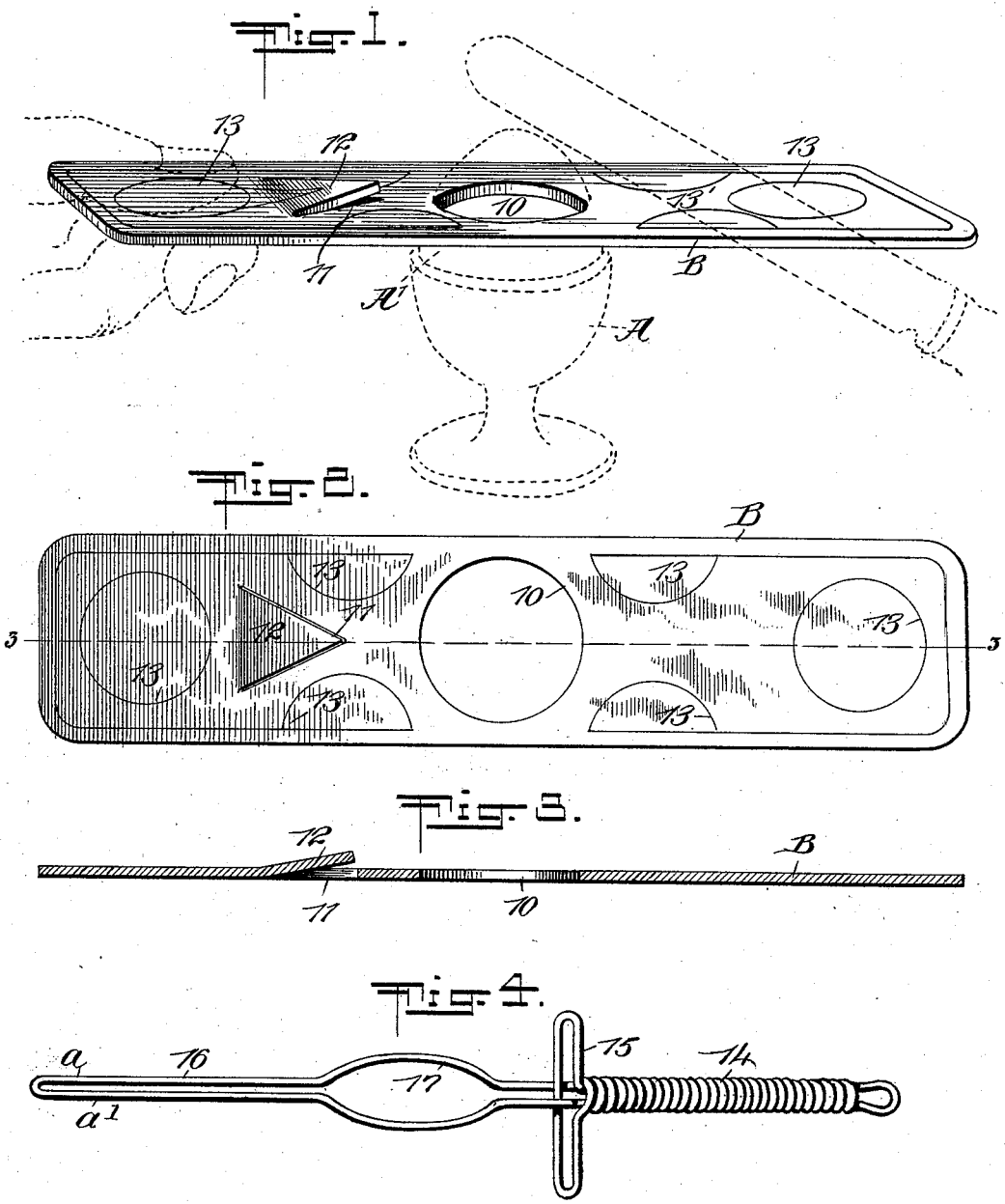
INVENTOR
George J. Haslam
BY
ATTORNEYS
WITNESSES No. 746,505.                                    Patented December 8, 1903.

UNITED STATES PATENT OFFICE.

GEORGE JAMES HASLAM, OF FREMONT, NEBRASKA.

GUIDE AND REGULATING DEVICE FOR EGG-CUTTERS.

SPECIFICATION forming part of Letters Patent No. 746,505, dated December 8, 1903.

Application filed August 19, 1903. Serial No. 170,001. (No model.)

*To all whom it may concern:*

Be it known that I, GEORGE JAMES HASLAM, a subject of the King of Great Britain and Ireland, and a resident of Fremont, in the county of Dodge and State of Nebraska, have invented a new and Improved Guide and Regulating Device for Egg-Cutters, of which the following is a full, clear, and exact description.

The purpose of my invention is to provide a simple device adapted to be placed by hand over an egg when in an egg-cup, the device being so constructed that it defines or regulates the extent to which the end portions shall be severed from the body of the egg and provides a guard to receive the cutting implement after the cutting operation is completed, which guard prevents the cutting implement at the end of the stroke accidentally injuring the operator, while the entire body of the device serves as a guide for the cutting implement during the cutting operation.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the device applied to an egg-cup. Fig. 2 is a plan view of the device. Fig. 3 is a longitudinal section taken practically on the line 3 3 of Fig. 2, and Fig. 4 is a plan view of a device constructed solely of wire.

In the form of the device shown in Figs. 1, 2, and 3 the body B of the device is made of a suitable gage consistent with strength, so that the said body can be readily operated by one hand and be placed over an egg A' when in an egg-cup A or a suitable support. The body B is provided with an opening 10, preferably centrally located, and this opening is of such diameter as to admit of a predetermined portion of the egg at an end extending above the upper surface of the body of the device when the said opening 10 is made to receive the said end portion of the egg, as is illustrated in Fig. 1. Adjacent to one side of the opening 10 a substantially triangular cut 11 is made in the body, comprising two members which at their point of juncture face the central portion of the opening 10 and are practically in longitudinal alinement with a line drawn through the center of the body, as is illustrated in Fig. 2, and the material loosened from the body by the aforesaid cuts 11 is bent upward beyond the plane of the upper face of the body to form a triangular guard 12. This guard is located at the left-hand side of the said opening 10. The parts designated as 13 in the drawings are simply ornaments.

In the operation of the device it is grasped, for example, by the left hand at its left-hand end and is then placed over an egg when in an egg-cup or suitable support, so that a portion of an end of the egg will extend above the upper face of the body B, as is shown in Fig. 1. An ordinary table-knife is then used, the upper face of the body B serving as a guide for the knife, and as the knife is slid along the upper face of the body it is directed to the projecting portion of the egg, which portion is then duly severed by the knife in a cleanly manner, and as the knife progresses toward the left-hand end of the body where the hand is holding the latter the knife is wedgingly caught between the body and the guard 12, thus preventing the edge of the knife from becoming dulled and also from possibly engaging with the fingers of the hand holding the device in position.

In Fig. 4 I have illustrated a device of the character above described made entirely of wire, which latter device comprises a twisted handle 14, a guard 15, extending transversely of the handle at its inner end and a predetermined distance beyond the sides of the body 16, which is a continuation of the handle and is formed in two members $a$ and $a'$, formed by bending the wire suitably upon itself. The body 16 is of bar shape and extends directly from the guard 15 of the handle, and adjacent to the said guard 15 the members $a$ and $a'$ of the body are bent outwardly or in opposite directions to form a circular or elongated opening 17, as may be desired, to receive the upper portion of an egg when in a support. The knife or cutting implement acts with relation to the form of the device shown in Fig. 4 in the same manner as it does with relation to the plate form of the device.

It will be observed that the device is exceedingly effective for the purpose intended and that it is very simple and economic in construction as well as safe in use. It may be expeditiously and conveniently applied and may be made an ornament to a table-service.

Having thus described my invention, I claim as new and desire to secure by Letters Patent—

1. A guide and regulating device for egg-cutters, comprising a body portion having an opening therein, adapted to receive a portion of an egg, and means at the side of said opening to wedgingly receive the sides of the blade of a knife when struck thereinto.

2. A guide and regulating device for egg-cutters, comprising a body portion having an opening therein through which the end of an egg is adapted to extend, the body being further provided with a triangular struck-up portion facing toward said opening and located between the opening and the end of the device, said struck-up portion forming an upwardly-extending guard coöperating with the upper face of the device to form angular surfaces facing the said opening in the body, and adapted to yieldingly and wedgingly engage the sides of a knife-blade when struck thereinto.

In testimony whereof I have signed my name to this specification in the presence of two subscribing witnesses.

GEORGE JAMES HASLAM.

Witnesses:
  GEO. F. LOOSCHEN,
  AUG. J. ALBERS.